(12) United States Patent
Choi et al.

(10) Patent No.: US 11,731,884 B2
(45) Date of Patent: *Aug. 22, 2023

(54) WATER PURIFIER FILTER, AND WATER PURIFIER COMPRISING SAME

(71) Applicant: LG Electronics Inc., Seoul (KR)

(72) Inventors: Yuseung Choi, Seoul (KR); Sangduck Lee, Seoul (KR); Suchang Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 866 days.

This patent is subject to a terminal disclaimer.

(21) Appl. No.: 16/467,094

(22) PCT Filed: Dec. 6, 2017

(86) PCT No.: PCT/KR2017/014262
§ 371 (c)(1),
(2) Date: Jun. 6, 2019

(87) PCT Pub. No.: WO2018/106031
PCT Pub. Date: Jun. 14, 2018

(65) Prior Publication Data
US 2019/0389740 A1  Dec. 26, 2019

(30) Foreign Application Priority Data
Dec. 6, 2016 (KR) .......................... 10-2016-0165216

(51) Int. Cl.
| C02F 1/00 | (2023.01) |
| C02F 1/62 | (2023.01) |
| B01D 35/04 | (2006.01) |
| B01D 35/30 | (2006.01) |
| B01D 39/20 | (2006.01) |
| C02F 101/20 | (2006.01) |

(52) U.S. Cl.
CPC .............. *C02F 1/003* (2013.01); *B01D 35/04* (2013.01); *B01D 35/30* (2013.01);
(Continued)

(58) Field of Classification Search
CPC .... C02F 1/003; C02F 1/62; C02F 1/00; C02F 1/28; C02F 1/42; C02F 1/283;
(Continued)

(56) References Cited

U.S. PATENT DOCUMENTS

| 2003/0140785 A1* | 7/2003 | Koslow ..................... A61L 9/16 96/153 |
| 2010/0006508 A1* | 1/2010 | Mitchell .................. C02F 1/28 210/252 |

(Continued)

FOREIGN PATENT DOCUMENTS

| EP | 0956159 B1 * | 3/2003 | .............. B01J 39/10 |
| JP | 2003-085640 | 3/2003 | |

(Continued)

OTHER PUBLICATIONS

KR 20150007128 A, Park Jong Hun et al., Jan. 2015.*
(Continued)

*Primary Examiner* — Akash K Varma
(74) *Attorney, Agent, or Firm* — Fish & Richardson P.C.

(57) ABSTRACT

The present invention relates to a water purifier filter, and a water purifier including the same. The water purifier filter and the water purifier including the same according to the present invention include a filter housing including an inlet and an outlet, and a filter module provided in the filter housing to purify water introduced through the inlet and to supply the water to the outlet, and a material of the filter module includes sodium orthotitanate ($Na_4TiO_4$) to remove a heavy metal under water, thereby effectively removing a heavy metal including cadmium under water.

8 Claims, 7 Drawing Sheets

(52) U.S. Cl.
CPC ..... *B01D 39/2027* (2013.01); *B01D 39/2062* (2013.01); *C02F 1/62* (2013.01); *C02F 2101/20* (2013.01); *C02F 2201/002* (2013.01); *C02F 2307/06* (2013.01)

(58) Field of Classification Search
CPC ............ C02F 2101/20; C02F 2201/002; C02F 2307/06; C02F 9/00; B01D 35/04; B01D 35/30; B01D 35/00; B01D 39/2027; B01D 39/2062; B01D 39/1692; B01D 39/20; B01D 39/14; B01D 2239/0442; B01D 61/00; B01J 39/10; C01G 23/00; C01G 23/053; G07F 13/00; G21F 9/12; C12H 1/0408
USPC ......................................................... 210/282
See application file for complete search history.

(56) References Cited

U.S. PATENT DOCUMENTS

| | | | | |
|---|---|---|---|---|
| 2010/0059447 | A1* | 3/2010 | Martikainen | C01G 23/0534 210/660 |
| 2012/0103911 | A1 | 5/2012 | Knoll et al. | |
| 2015/0136704 | A1 | 5/2015 | Mori et al. | |

FOREIGN PATENT DOCUMENTS

| | | | | |
|---|---|---|---|---|
| KR | 10-2015-0007128 | | 1/2015 | |
| KR | 20150007128 A | * | 1/2015 | ............ B01D 35/00 |
| KR | 1020150007128 | | 1/2015 | |
| WO | 97/23290 | | 7/1997 | |

OTHER PUBLICATIONS

Korean Office Action in KR Appln. No. 10-2016-0165216, dated Jan. 18, 2021, 13 pages (with English translation).

Sounthararajah et al., "Adsorptive removal of heavy metals from water using sodium titanate nanofibres loaded onto GAC in fixed-bed columns," Journal of Hazardous Materials, Feb. 2, 2015, 10 pages.

International Search Report in International Application No. PCT/KR2017/014262, dated Apr. 16, 2018, 4 pages.

Extended European Search Report in European Appln. No. 17878662.0, dated Apr. 7, 2020, 7 pages.

\* cited by examiner

FIG. 7

| RESULT OF EXPERIMENT OF REMOVING HEAVY METAL | | |
|---|---|---|
| ITEM | FILTER INCLUDING MATERIAL WITHOUT $Na_4TiO_4$ | FILTER INCLUDING MATERIAL INCLUDING $Na_4TiO_4$ |
| ARSENIC (As) | ○ | ○ |
| SELENIUM (Se) | ○ | ○ |
| LEAD (Pb) | ○ | ○ |
| ALUMINUM (Al) | ○ | ○ |
| MERCURY (Hg) | ○ | ○ |
| CHROMIUM (Cr) | ○ | ○ |
| IRON (Fe) | ○ | ○ |
| COPPER (Cu) | ○ | ○ |
| CADMIUM (Cd) | × | ○ |
| MANGANESE (Mn) | × | × (12%) |
| ZINC (Zn) | × | × (28%) |
| NUMBER OF REMOVED ITEMS | EIGHT | NINE |

○ : REMOVED
× : NOT REMOVED

WATER PURIFIER FILTER, AND WATER PURIFIER COMPRISING SAME

CROSS-REFERENCE TO RELATED APPLICATIONS

This application is a National Stage application under 35 U.S.C. § 371 of International Application No. PCT/KR2017/014262, filed on Dec. 6, 2017, which claims the benefit of Korean Patent Application No. 10-2016-0165216, filed on Dec. 6, 2016. The disclosures of the prior applications are incorporated by reference in their entirety.

TECHNICAL FIELD

The present invention relates to a water purifier filter and a water purifier including the same.

BACKGROUND ART

In general, a home appliance such as a vacuum cleaner uses a wireless technology allowing cleaning with only battery power without the connection with a power supply for a predetermined time, by using the battery for the convenient of the user. The water purifier refers to a device of purifying raw water such as tap water or underground water. In other words, the water purifier refers to a device to change raw water to drinking water to be provided through various water purifying manners.

To produce purified water, the processes of precipitation, filtration, and sterilization may be performed, and harmful material may be usually removed through the processes.

In general, various filters may be provided in the water purifier to purify raw water. These filters may be classified with a sediment filter, an activated carbon filter, a UF hollow fiber membrane filter, an RO membrane filter, or the like depending on the functions thereof.

The sediment filter may precipitate larger contaminants or flowing matters in the raw water. The activated carbon filter may be a filter to adsorb and remove smaller contaminants, residual chlorine, volatile organic compounds, or factors making odor.

In general, two activated carbon filters may be provided. In other words, the two activated carbon filters may include a pre carbon filter provided for the raw water and a post carbon filter provided for the purified water. The post car bon filter may be provided to improve water taste by removing the material of causing odor exerting an influence on the taste of purified water.

In addition, typically, the UF hollow fiber membrane filter and the RO membrane filter are selectively used.

Recently, the demands for the water purifier have been remarkably increased. Accordingly, various requirements are made, but it may be difficult to satisfy all the requirements.

For example, when the RO membrane filter is applied, the heavy metal may be removed, but an amount of purified water may not be ensured. In other words, it takes too much time to obtain a desired amount of purified water.

Meanwhile, when the UF hollow fiber membrane filter is applied, a larger amount of water is ensured, but it is difficult to remove a heavy metal under water. Accordingly, it may be difficult to use underground water or tap water in a contaminated area as raw water.

Accordingly, the removal of the heavy metal may be recognized as being incompatible with ensuring a larger amount of water. This is because it is difficult to ensure a larger amount of water when the RO membrane filter is used to remove the heavy metal, and it is difficult to remove the heavy metal when the UF hollow fiber membrane filter is used to ensure a larger amount of water.

In addition, conventionally, heavy metal removing filters have been manufactured to mainly remove the total eight kinds of arsenic (As), selenium (Se), lead (Pb), aluminum (Al), mercury (Hg), chromium (Cr), iron (Fe), and copper (Cu).

However, recently, cadmium (Cd) has to be removed under water in addition to the eight kinds of metals.

However, in the conventional water purifier, it is difficult to perfectly remove the eight kinds of heavy metals while ensuring a larger amount of water, and it is difficult to sufficiently remove cadmium (Cd) under water.

Disclosure

Technical Problem

The present invention suggests a water purifier filter, capable of effectively removing an underwater heavy metal including cadmium (Cd), and a water purifier in order to solve the above problem.

The present invention suggests a water purifier filter, capable of ensuring a treatment capacity while removing chloroform under water as well as a heavy metal such as lead, mercury, arsenic, selenium, iron, chromium, aluminum, or copper under water and a water purifier including the same.

The present invention suggests a water purifier filter, which is directly applicable to an existing water purifier without changing the shape or the arrangement structure of the filter applied to a water purifier, and a water purifier including the same.

The present invention suggests a water purifier filter, capable of increasing the space utilization by arranging a heterogeneous filter in one filter housing in a longitudinal direction to reduce a filter volume, and a water purifier including the same.

Technical Solution

According to the present invention, the water purifier filter may include a filter housing including an inlet and an outlet, and a filter module provided in the filter housing to purify water introduced through the inlet and to supply the water to the outlet, and the material of the filter module may include sodium orthotitanate ($Na_4TiO_4$) to remove a heavy metal under water. Accordingly, the heavy metal including cadmium (Cd) may be effectively removed under water.

In addition, the material of the filter module further includes a synthetic iron hydroxide ($\alpha$-FeOOH) compound. Accordingly, a heavy metal such as lead, mercury, arsenic, selenium, iron, chromium, aluminum, or copper may be removed under water.

Further, the material of the filter module may further include activated carbon and a binder. Accordingly, chloroform may be removed under water, the binding of a material constituting the filter may be simpler and the rigidity may be ensured.

Further, the filter may include a heavy metal removing filter manufactured by mixing the sodium orthotitanate ($Na_4TiO_4$), activated carbon, and a binder; and a membrane filter. Therefore, the process of purifying water is performed several times through a plurality of filters. Accordingly, various foreign matters including the heavy metal may be more firmly performed.

In addition, the filter may further include an activated carbon filter, and the activated carbon filter and the membrane filter may be received in one filter housing and aligned in line with each other such that water output through the membrane filter passes through the activated carbon filter. Therefore, the heterogeneous filter is provided in the longitudinal direction inside one filter housing to reduce the volume of the filter, thereby increasing the space utilization and realizing the slim water purifier.

Advantageous Effects

According to the present invention, heavy metals under water including cadmium (Cd) may be firmly removed.

According to the present invention, the treatment capacity may be ensured while removing chloroform under water as well as a heavy metal such as lead, mercury, arsenic, selenium, iron, chromium, aluminum, or copper under water.

According to the present invention, since the water is purified several times by the plurality of filters, various types of foreign matters may be more firmly removed as well as the heavy metal.

According to the present invention, since only the material of the filter is changed, and the shape or the arrangement structure of the filter applied to the water purifier is not changed, the present invention may be directly applied to the existing water purifier.

According to the present invention, the space utilization may be increased by arranging the heterogeneous filter in one filter housing in the longitudinal direction to reduce the filter volume, and the slim water purifier may be implemented.

DESCRIPTION OF DRAWINGS

FIG. 7 is a table illustrating a heavy metal removal effect of the water purifier filter, according to an embodiment of the present invention.

BEST MODE

Mode for Invention

Hereinafter, the detailed embodiment of the present invention will be described with reference to accompanying drawings. However, the spirit of the present invention is not limited to embodiments suggested hereinafter, and those skilled in the art, which understand the spirit of the present invention, can easily reproduce another embodiment falling within the scope of the present invention by adding, modifying, and deleting a component.

In the accompanying drawing for the following embodiments, fine parts may be expressed mutually differently according to drawings. In addition, a specified part may not be expressed or exaggeratedly expressed depending on drawings.

Figure 1:
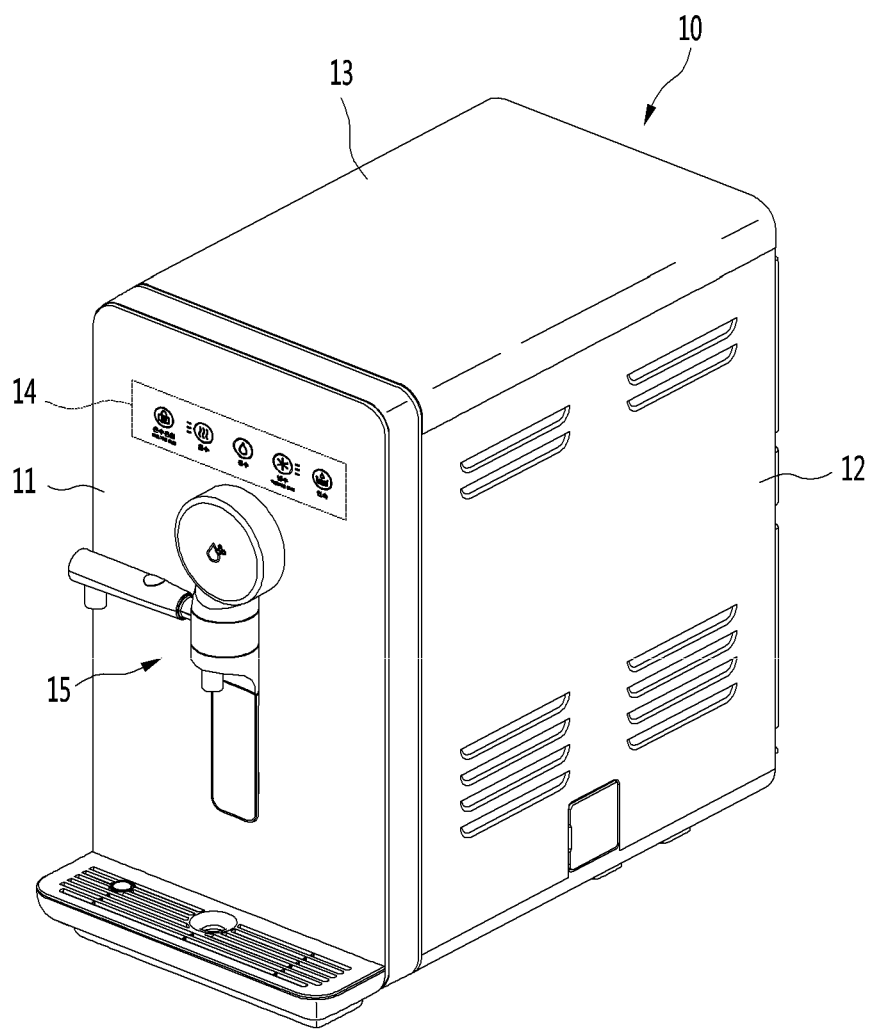
FIG. 1 is a perspective view illustrating a water purifier, according to an embodiment of the present invention.

FIG. 1 is a perspective view illustrating a water purifier, according to an embodiment of the present invention.

Referring to FIG. 1, according to an embodiment, a water purifier 10, which is to purify the water directly supplied from an external water source, and then to cool, heat, and extract the water, may be, for example, a direct water type water purifier.

In this case, the direct water type water purifier refers to a water purifier having the structure in which the purified water is extracted without a water tank for storing the purified water when the user extracts the purified water.

In addition, a water purifier 10 may have an outer appearance formed by combining a plurality of panels with each other. In more detail, the water purifier 10 may have a substantially hexahedral shape as a front panel 11 forming a front outer appearance, side panels 12 forming outer appearances of opposite side surfaces, a top surface panel 13 forming a top surface outer appearance, and a base panel forming a bottom surface outer appearance are combined with each other. In addition, a plurality of parts for purifying water are provided in an internal space formed by combining the panels.

In addition, the front panel 11 is provided thereon with an operation display unit 14 to allow a user to input an operation command of the water purifier 10 and to display the operation state of the water purifier 10.

The operation display unit 14 is provided in the form of a plurality of buttons or a touch screen such that light is irradiated to each button. In other words, when the user presses or touches the button of the operation display unit 14, the selected button is irradiated with light to allow the user to easily recognize whether the button is selected, and to simultaneously perform the function of the display unit.

The operation display unit 14 includes a button to select the kind of water to be extracted, that is, a button to select cold water, hot water or purified water (water at the room temperature), a button to continuously dispense water, a button to identify a power state of the hot water, and a display unit to display the temperatures of the hot water or the cold water.

In addition, the operation display unit 14 may further include a button to perform an additional function, and some buttons may be omitted from the operation display unit 14.

A water chute 15, which is operable by the user to dispense purified water, is provided below the operation display unit 14. The water chute 15 is provided so that the user may operate the water chute 15 to dispense the purified water. The water chute 15 has a function of opening and closing a water outlet to allow the user to extract the purified water, so the water chute 15 is referred to as an opening/closing device or an opening/closing nozzle.

The water chute 15 is configured to dispense purified water, cold water, or hot water depending on the functions of the water purifier 10 by the operation of the user. In addition, a tray is provided below the water chute 15, in detail, at a front lower end portion of the front panel 11 to receive water dropped from the water chute 15.

The tray is provided in the shape of a hexahedron having an internal space and provided on the top surface thereof with a grill-shaped cover to filter out foreign substances. The tray is movable forward from the front panel 11. Such movement of the tray allows the user to put purified water even in a bottle having a higher height or a container having a wider bottom surface.

In addition, the tray further includes a buoy for checking the level of water contained in the internal space thereof. The user may recognize the timing to empty water from the tray by recognizing such a buoy, thereby improving the convenience of user.

Although not illustrated, a plurality of components including a refrigerant cycle to cool water, a cold water generating unit to generate cold water, and a hot water generating unit to heat water are received inside the panels forming the outer appearance of the water purifier 10.

In detail, the water purifier 10 may include a compressor to compress the refrigerant into a gas-phase refrigerant having a high temperature and high pressure, a condenser to condense the refrigerant discharged from the compressor to a liquid-phase refrigerant having the high temperature and high pressure, and a condensing fan to exchange heat with the condenser.

In addition, the water purifier 10 may further include a filter assembly to filter out foreign substances contained in water supplied from the water supply source. The filter assembly may include a carbon filter.

In addition, the water purifier 10 may further include an expansion valve to expand the refrigerant discharged from the condenser to a two-phase refrigerant having a low temperature and low pressure and an evaporator (to be described later) through which the two-phase refrigerant having the low temperature and low pressure, which is subject to the expansion valve, flows.

In addition, the water purifier 10 may further include a cold water generating unit (to be described later) including the evaporator and a cold water pipe (to be described later) through which the cold water flows.

Further, the water purifier 10 may further include a hot-water heater to heat the water to be supplied to a set temperature.

Figure 2:
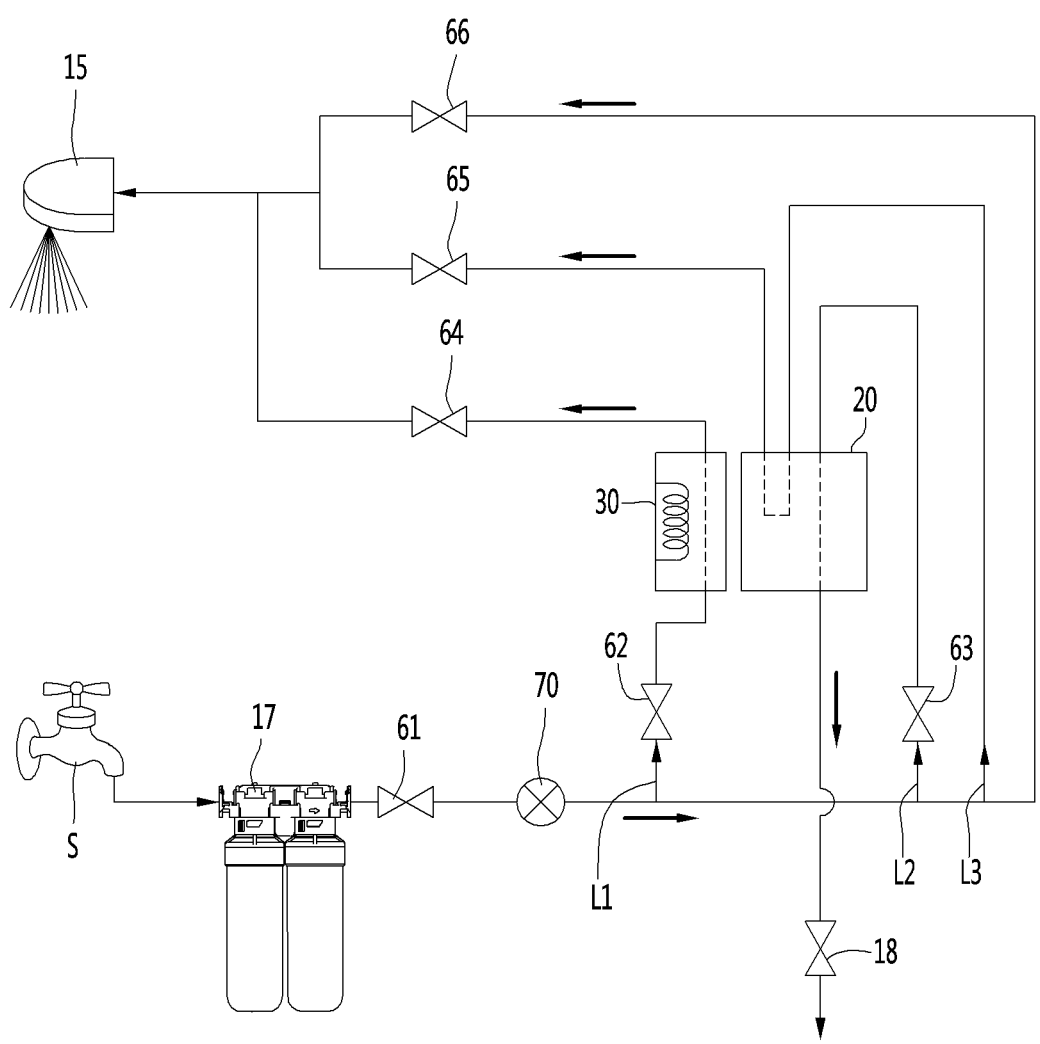
FIG. 2 is a view illustrating piping configuration of the water purifier of FIG. 1.

FIG. 2 is a view illustrating the piping feature of the water purifier illustrated in FIG. 1.

Referring to FIG. 2, a water supply line L may extend from a water supply source S to the water chute 15 of the water purifier 10, and various valves and purified water parts may be connected to the water supply line L.

In more detail, the water supply line L is connected to the water supply source S, for example, a faucet at home, and a filter assembly 17 is disposed at a certain point in the water supply line L to filter out foreign substances from drinking water supplied from the water supply source S.

In addition, a water supply valve 61 and a flow sensor 70 are sequentially arranged on the water supply line L connected to an outlet end of to the filter assembly 17. Therefore, when a supply amount sensed by the flow sensor 70 reaches a set amount, the water supply valve 61 may be controlled to be closed.

In addition, a hot water supply line L1, a cold water supply line L3, and a cooling water supply line L2 may branch from a certain point of the water supply line L extending from the outlet end of the flow sensor 70.

In addition, a purified water dispensing valve 66 is mounted at an end portion of the water supply line L extending from the outlet end of the flow sensor 70, and a hot water dispensing valve 64 is mounted at an end portion of the hot water supply line L1. In addition, a cold water dispensing valve 65 may be mounted at an end portion of the cold water supply line L3, and a cooling water valve 63 may be mounted at a certain point of the cooling water supply line L2. The cooling water valve 63 may adjust an amount of cooling water supplied to a cold water generating unit 20.

In addition, all water supply lines extending from the outlet ends of the hot water dispensing valve 64, the cold water dispensing valve 65, and the purified water dispensing valve 66 are connected to the water chute 15 In addition, as illustrated in drawings, the purified water, the cold water, and the hot water may be configured to be connected to a single outlet, and may be configured to be connected to independent outlets, respectively, according to occasions.

Hereinafter, the processes of supplying the cold water and hot water will be described.

First, in the case of cold water, when the cooling water valve 63 is open and cooling water is supplied to the cold water generating unit 20, the water of the cold water supply line L3 passing through the cold water generating unit 20 is cooled by the cooling water, so the cold water is generated.

In this case, the cooling water supply line L2 may have a refrigerant cycle to cool the cooling water. The refrigerant cycle may include a compressor, a condenser, an expansion valve, an evaporator, and the like.

Thereafter, when the button to select cold water in the operation display unit is pressed and the cold water dispensing valve 65 is open, the cold water may be dispensed through the water chute 15.

Meanwhile, in the case of hot water, water flowing through the hot water supply line L1 is heated by the hot-water heater 30 to generate the hot water. When the button to select hot water in the operation display unit is pressed and the hot water dispensing valve 64 is open, the hot water may be dispensed through the water chute 15.

The water purifier having the above configuration according to an embodiment of the present invention includes at least one water purifier filter to purify water from the raw water. The water purifier filter will be described later.

Hereinafter, the water purifier filter according to an embodiment of the present invention will be described.

Figure 3:
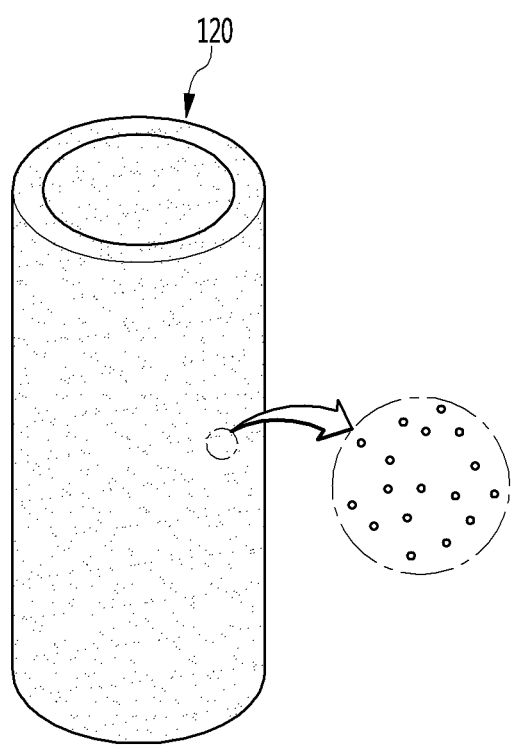
FIG. 3 is a view schematically illustrating a filter module constituting the water purifier filter, according to an embodiment of the present invention.
Figure 4:
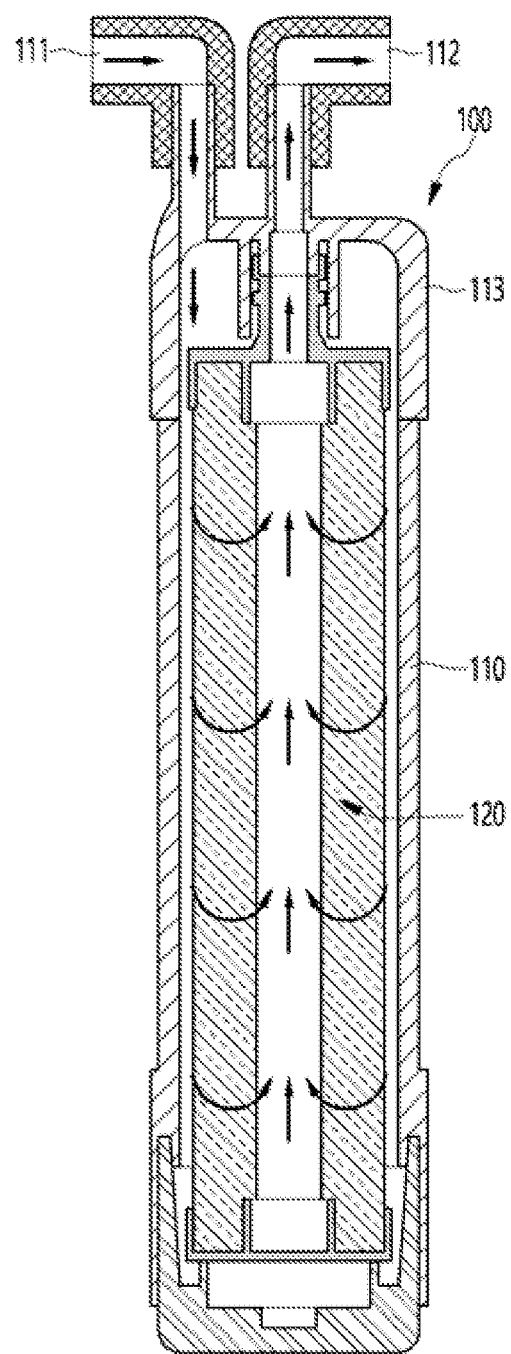
FIG. 4 is a sectional view illustrating the water purifying filter, according to an embodiment of the present invention.

FIG. 3 is a view schematically illustrating a filter module constituting the water purifier filter, according to an embodiment of the present invention, and FIG. 4 is a sectional view illustrating the water purifying filter, according to an embodiment of the present invention.

Referring to FIGS. 3 to 4, the water purifier filter according to an embodiment of the present invention includes a filter housing 110 and a filter module 120.

First, the filter housing 110 includes an inlet 111 and an outlet 112. In other words, water necessary to be purified is introduced through the inlet 111 and purified water is discharged through the outlet 112. Accordingly, the water is purified by the filter module 120 disposed between the inlet 111 and the outlet 112 while flowing between the inlet 111 and the outlet 112.

In addition, the filter housing 110 may have a space part to receive the filter module 120 therein and may include an upper cap 113 having the inlet 111 and the outlet 112. In this case, the space part of the filter housing 110 may communicate with the outside through the inlet 111 and the outlet 112 of the upper cap 113.

The filter module 120 may be easily provided in the space part of the filter housing 110 or the filter module 120 received in the filter housing 110 may be easily replaced, by opening the upper cap 113 when the upper cap 113 is provided as described above.

The water introduced into the filter housing 110 through the inlet 111 may be purified while passing through the filter module 120. In other words, foreign substances (e.g., a heavy metal) contained in raw water, such as tap water, may be removed while passing through the filter module 120.

According to the present embodiment, a water purifier filter having the excellent effect of removing heavy metal under water and a water purifier having the same may be provided.

To this end, the material of the filter module 120 preferably includes sodium orthotitanate ($Na_4TiO_4$).

In addition, the filter module 120 is preferably a filter module allowing water to pass therethrough due to the difference in pressure between front and rear ends thereof. In this case, water introduced into the filter housing 110 through one inlet 111 may be purified while passing through the filter module 120 and may be discharged to the outside of the filter housing 110 through one outlet 112. Accordingly, a sufficient flow may be ensured together with the effect of removing the heavy metal.

Figure 5:
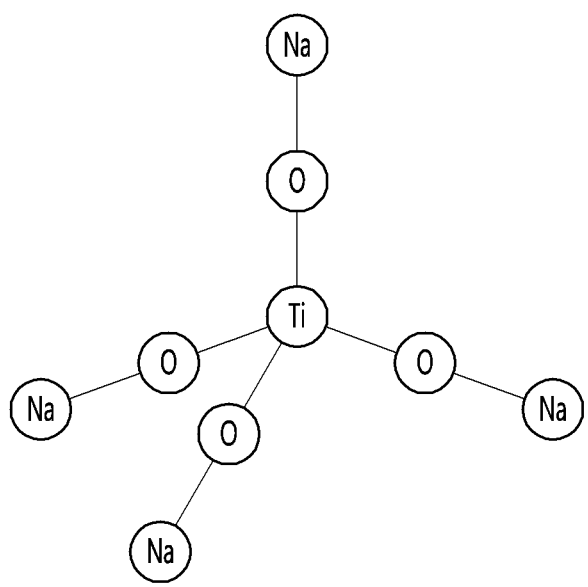
FIG. 5 is a view illustrating a structural formula of sodium orthotitanate constituting the filter module of FIG. 3.

FIG. 5 is a view illustrating a structural formula of sodium orthotitanate constituting the filter module of FIG. 3.

Referring to FIG. 5, the sodium orthotitanate (Na4TiO4) may include a function group as illustrated in following formula 1.

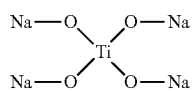

Formula 1

In other words, each of a plurality of oxygen atoms (O) may are bonded to sodium (Na) and the oxygen atoms (O) are covalently bonded to one titanium atom (Ti)

In addition, the sodium orthotitanate ($Na_4TiO_4$) may remove a heavy metal under water through a chemical equation expressed as in following formula 2.

$$Na_4TiO_4+2Me^{++} \rightarrow Me_2TiO_4+4Na^+ \quad \text{Formula 2}$$

In formula 2, "Me" refers to a heavy metal, and the heavy metal is melted in the form of a water-soluble compound under water.

The purified water, from which the heavy metal (Me) is removed through the chemical reaction between a water-soluble heavy metal compound and the sodium orthotitanate ($Na_4TiO_4$), is discharged to the outside of the filter housing 110 through the outlet 112.

For example, the heavy metal (Me) may correspond to cadmium (Cd).

In the above case, the sodium orthotitanate ($Na_4TiO_4$) may remove cadmium (Cd) through a chemical equation expressed as in the following Formula 3.

$$Na_4TiO_4+2Cd^{++} \rightarrow Cd_2TiO_4+4Na^+ \quad \text{Formula 3}$$

The sodium orthotitanate ($Na_4TiO_4$) may be formed in a granule or powder form and may be charged in the filter module 120. Accordingly, when the water, in which the heavy metal is melted, passes through the filter module 120, the heavy metal may be removed from the water.

In addition, the material of the filter module 120 may further include a synthetic iron hydroxide (α-FeOOH) compound.

The synthetic iron hydroxide (α-FeOOH) compound may include a functional group expressed as in following formula 4.

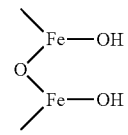

Formula 4

In other words, the synthetic iron hydroxide (α-FeOOH) compound may include a functional group in which each of a plurality of irons (Fe) is ionically bonded to a hydroxyl group (—OH) and the irons (Fe) are ionically or covalently bonded to one oxygen.

Bayoxide E 33 from Lanxess may be used as an example of such a synthetic iron hydroxide (α-FeOOH) compound.

The synthetic iron hydroxide (α-FeOOH) compound may remove a heavy metal under water through the chemical reaction expressed as in following Formula 5.

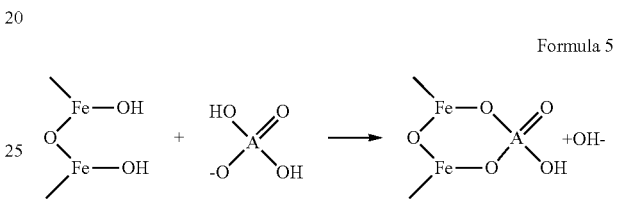

Formula 5

In the formula, "A" may refer to a heavy metal, and the heavy metal may be dissolved in water in the form of a water soluble compound.

As described above, when the water soluble heavy metal compound and the synthetic iron hydroxide (α-FeOOH) compound are subject to the chemical reaction, water and hydroxide ions are produced. In addition, the heavy metal (A) is strongly ionically or covalently bonded with the synthetic iron hydroxide (α-FeOOH) compound. Accordingly, the removed heavy metal (A) may be prevented from being dissolved again in water. The purified water from which the heavy metal A is removed through the filter module 120 is discharged to the outside of the filter housing 110 through the outlet port 112.

The sodium orthotitanate ($Na_4TiO_4$) compound may be provided in the form of granules or powders and may be charged in the filter module 120. Accordingly, when the water, in which the heavy metal is melted, passes through the filter module 120, the heavy metal may be removed from the water.

In addition, the filter module 120 may further include activated carbon and a binder.

The activated carbon may be included in the form of granules or powders. When the activated carbon is included in the filter module 120 as described above, the filter module 120 may remove a heavy metal under water while effectively removing remaining chlorine components in the water. There, the water taste may be improved.

In addition, chloroform ($CHCL_3$) under water may be effectively removed by the activated carbon.

Meanwhile, the binder is mixed with the activated carbon and the sodium orthotitanate ($Na_4TiO_4$) or the synthetic iron hydroxide (α-FeOOH) compound to bind the activated carbon and the sodium orthotitanate ($Na_4TiO_4$) or the synthetic iron hydroxide (α-FeOOH) compound to provide rigidity. Through the configuration of the binder, the activated carbon, the sodium orthotitanate ($Na_4TiO_4$), and the synthetic iron hydroxide (α-FeOOH) compound may be processed in the form of a filer having rigidity.

For example, the filter module 120 may be formed by uniformly mixing the above-described materials, putting the mixture into a mold, and heating the result. The binder, for example, polyethylene is melted through heating inside the mold. Accordingly, the sodium orthotitanate ($Na_4TiO_4$), the synthetic iron hydroxide α-FeOOH) compound, or the activated carbon is bonded with the polyethylene. Accordingly, the filter module 120 substantially having the form of a block with rigidity may be formed.

In general, a water purifier has several filers to remove a heavy metal under water and various types of foreign substances. When several filters are provided, although the performance of purifying water is ensured, an amount of water purified is reduced.

In addition, a space for a filter is confined in an existing water purifier, so a new filter may not be easily added. In addition, since each filter provided in the water purifier (e.g., the activated carbon filter) basically has an individual function to improve the performance of purifying water, it is not preferred to omit the existing filter so as to add the new filter.

However, according to the present invention, a heavy metal removing filter 100 may be configured by mixing the sodium orthotitanate ($Na_4TiO_4$) or the synthetic iron hydroxide ($\alpha$-FeOOH) compound with the activated carbon.

Accordingly, the intrinsic function and effect of the activated filter provided in the existing water purifier are maintained while removing a heavy metal under water without the increase in the number of filters. In addition, since the number of filters is not increased, an amount of water to be purified may be prevented.

Figure 6:
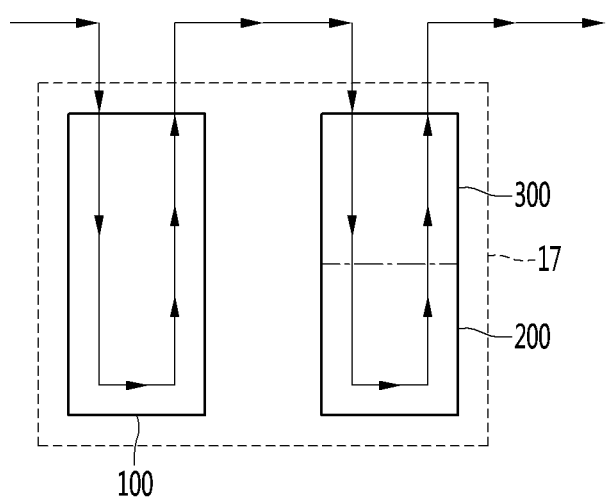
FIG. 6 is a view schematically illustrating the water purifier filter, according to an embodiment of the present invention.

FIG. 6 is a schematic view illustrating the water purifier filter according to an embodiment of the present invention.

Referring to FIG. 6, a plurality of water purifier filters according to the present invention may be provided to form the filter assembly 17.

For example, the filter assembly 17 may include the heavy metal removing filter 100 manufactured by mixing the sodium orthotitanate ($Na_4TiO_4$), the activated carbon, and the binder.

As another example, the heavy metal removing filter 100 may further include the synthetic iron hydroxide ($\alpha$-FeOOH) compound.

In other words, the heavy metal removing filter 100 may be manufactured by mixing the sodium orthotitanate ($Na_4TiO_4$), the activated carbon, and the binder or by mixing the sodium orthotitanate ($Na_4TiO_4$), the synthetic iron hydroxide ($\alpha$-FeOOH) compound, the activated carbon, and the binder.

According to the present embodiment, the sodium orthotitanate ($Na_4TiO_4$) and the synthetic iron hydroxide ($\alpha$-FeOOH) compound may be mixed with proportions in the range of 10% by weight to 30% by weight of the filter module 120.

At this time, when the proportion of the sodium orthotitanate ($Na_4TiO_4$) and the synthetic iron hydroxide ($\alpha$-FeOOH) is greater than 30% by weight, the heavy metal removal performance may be increased, but an amount of water to be purified may be reduced. Meanwhile, when the proportion of the sodium orthotitanate ($Na_4TiO_4$) and the synthetic iron hydroxide ($\alpha$-FeOOH) is less than 10% by weight, the amount of water to be purified may be increased, and the heavy metal removal performance may be reduced.

Accordingly, it is preferred that the sodium orthotitanate ($Na_4TiO_4$) and the synthetic iron hydroxide ($\alpha$-FeOOH) compound may be mixed with each other with proportion in the range of 10% by weight to 30% by weight of the filter module 120.

In addition, the proportion of the sodium orthotitanate ($Na_4TiO_4$) and the synthetic iron hydroxide ($\alpha$-FeOOH) may be variously adjusted depending on the type and the proportion of the heavy metal included in water to be purified.

For example, the sodium orthotitanate ($Na_4TiO_4$) and the synthetic iron hydroxide ($\alpha$-FeOOH) may be mixed with each other at the ratio of 3:7.

In addition, the activated carbon may be mixed with the content in the range of 33% by weight to 53% by weight of the filter module 120.

In this case, when the proportion of the activated carbon is greater than 53% by weight, it may be difficult to ensure the heavy metal removal performance. When proportion of the activated carbon is less than 33% by weight, it may be difficult to remove chloroform and chlorine components under water. Accordingly, it is preferred that the activated carbon is mixed with proportion in the range of 33% by weight to 53% by weight of the filter module 120.

In addition, when the sodium orthotitanate ($Na_4TiO_4$) and the synthetic iron hydroxide ($\alpha$-FeOOH) compound may be mixed with the proportion in the range of 10% by weight to 30% by weight of the filter module 120, and when the activated carbon may be mixed with the content in the range of 33% by weight to 53% by weight of the filter module 120, the binder may be mixed with the proportion in the range of 17% by weight to 37% by weight.

In this case, when the proportion of the binder to be mixed is less than 17% by weight, the sodium orthotitanate ($Na_4TiO_4$), the synthetic iron hydroxide ($\alpha$-FeOOH), and the activated carbon may not be bonded with each other, or the rigidity of the made filter module 120 may not be ensured. When the proportion of the binder exceeds 37% by weight, the proportions of the sodium orthotitanate ($Na_4TiO_4$), the synthetic iron hydroxide ($\alpha$-FeOOH), and the activated carbon are excessively lowered. Accordingly, the filter may not smoothly perform the intrinsic function thereof. Therefore, it is preferred that the binder is mixed with the proportion in the range of 17% by weight to 37% by weight.

In addition, the mixing ratio of the sodium orthotitanate ($Na_4TiO_4$), the synthetic iron hydroxide ($\alpha$-FeOOH), the binder, and the activated carbon described above may be variously adjusted in the range for ensuring an amount of water to be purified to some extent while safely removing a heavy metal and chloroform under water.

In addition, the filter assembly 17 may further include a membrane filter 200 and an activated carbon filter 300.

When the membrane filter 200 is additionally provided as described above, a heavy metal, an ionic material, and a microorganism may be more effectively removed under water by employing a reverse osmotic membrane.

When the activated carbon filter 300 is additionally provided as described above, the water introduced into the filter assembly 17 may be purified several times while passing through the heavy metal removing filter 100, the membrane filter 200, and the activated carbon filter 300. Accordingly, various foreign substances including the heavy metal may be more firmly removed.

In particular, the chlorine component and the chloroform ($CHCL_3$) under the water may be more firmly removed due to the activated carbon filter 300 which is additionally provided.

According the present embodiment, the activated carbon filter 300 and the membrane filter 200, which are in the filter assembly 17, may be received in one filter housing. In this case, the membrane filter 200 and the activated carbon filter 300 may be aligned in line with each other such that the water output through the membrane filer 200 passes through the activated carbon filter 300.

As described above, when the activated carbon filter 300 and the membrane filter 200 are aligned in line with each other in one filter housing, the filter efficiency may be increased while an amount of water to be purified may be maintained.

In addition, the present invention may be directly applied only by replacing an existing filter with new one without enlarging the filter installation space formed in the water purifier.

In addition, the space utilization may be increased by reducing the volume of the filter, and the slim water purifier may be implemented.

Hereinafter, the effect of removing the heavy metal by the water purifier filter according to the present invention will be described with reference to FIG. 7.

First, the heavy metal removing filter was manufactured at two following types of mixing ratios to experiment the effect of removing the heavy metal based on the sodium orthotitanate ($Na_4TiO_4$), the synthetic iron hydroxide ($\alpha$-FeOOH).

Embodiment 1

For example, 95 g of a heavy metal removing filter 100 was manufactured by mixing 5.7 g of sodium orthotitanate ($Na_4TiO_4$), 13.3 g of iron hydroxide (FeOOH), 31.7 g of a binder, and 44.3 g of activated carbon.

Embodiment 2

As another example, 95 g of the heavy metal removing filter was manufactured by mixing 19 g of iron hydroxide (FeOOH), 31.7 g of a binder, and 44.3 g of activated carbon.

Thereafter, the experiment was performed by allowing water to pass through the heavy metal removing filter 100 including the sodium orthotitanate ($Na_4TiO_4$) according to Embodiment 1, and it may be recognized as the experimental result that lead, mercury, arsenic, selenium, iron, chromium, aluminum, copper and cadmium were removed from the water In addition, it may be recognized that manganese and zinc were partially removed.

Meanwhile, the experiment was performed by allowing water to pass through the heavy metal removing filter 100 without the sodium orthotitanate ($Na_4TiO_4$) according to Embodiment 2, and it may be recognized as the experimental result that lead, mercury, arsenic, selenium, iron, chromium, aluminum, and copper were removed from the water.

In other words, although most of heavy metals may be removed under water by the iron hydroxide (FeOOH), the heavy metal removing filter 100 including the sodium orthotitanate ($Na_4TiO_4$) has an effect of additionally removing cadmium (Cd) when compared with the heavy metal removing filter without the sodium orthotitanate ($Na_4TiO_4$).

The invention claimed is:

1. A water purifier filter comprising:
a filter housing including an inlet and an outlet; and
a filter module provided in the filter housing to purify water introduced through the inlet and to supply the water to the outlet,
wherein a material of the filter module is formed by mixing 10% by weight to 30% by weight of a mixture of sodium orthotitanate ($Na_4TiO_4$) and a synthetic iron hydroxide ($\alpha$-FeOOH) compound, 33% by weight to 53% by weight of an activated carbon, and 17% by weight to 37% by weight of a polyethylene, and
wherein a weight of the sodium orthotitanate ($Na_4TiO_4$) in the mixture is less than a weight of the synthetic iron hydroxide ($\alpha$-FeOOH) compound in the mixture.

2. The water purifier filter of claim 1, wherein the sodium orthotitanate ($Na_4TiO_4$) has a functional group of following Formula 1,

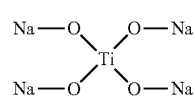

Formula 1

3. The water purifier filter of claim 1, wherein the sodium orthotitanate ($Na_4TiO_4$) removes a heavy metal (Me) under water through a chemical reaction based on following Formula 2,

Formula 2:

4. The water purifier filter of claim 1, wherein the sodium orthotitanate ($Na_4TiO_4$) removes cadmium (Cd) under water.

5. The water purifier filter of claim 1, wherein the water purifier filter includes:
a heavy metal removing filter; and
a membrane filter.

6. The water purifier filter of claim 5, wherein the water purifier filter further includes an activated carbon filter.

7. The water purifier filter of claim 6, wherein the activated carbon filter and the membrane filter are received in the filter housing, and aligned in line with each other such that water output through the membrane filter passes through the activated carbon filter.

8. The water purifier filter of claim 1, wherein a ratio of the sodium orthotitanate ($Na_4TiO_4$) to the synthetic iron hydroxide ($\alpha$-FeOOH) compound in the mixture is 3:7.

* * * * *